United States Patent [19]
Arackellian et al.

[11] Patent Number: 5,504,367
[45] Date of Patent: Apr. 2, 1996

[54] SYMBOLOGY READER ILLUMINATION SYSTEM

[75] Inventors: Kevork G. Arackellian, Everett; Steven M. Bunce, Mill Creek; Joel T. Aragon, Everett, all of Wash.

[73] Assignee: Intermec Corporation, Everett, Wash.

[21] Appl. No.: 215,853

[22] Filed: Mar. 21, 1994

[51] Int. Cl.⁶ .................................................... G06K 7/10
[52] U.S. Cl. ............................................. 235/472; 235/462
[58] Field of Search ...................................... 235/472, 462

[56] References Cited

U.S. PATENT DOCUMENTS

| | | | |
|---|---|---|---|
| 4,315,245 | 2/1982 | Nakahara | 235/472 |
| 4,488,679 | 12/1984 | Buckholt et al. | 235/472 |
| 4,703,186 | 10/1987 | Nakayama et al. | 235/472 |
| 4,743,773 | 5/1988 | Katana et al. | 250/566 |
| 4,793,812 | 12/1988 | Sussman et al. | 235/472 |
| 4,874,936 | 10/1989 | Chandler et al. | 235/494 |
| 4,877,949 | 10/1989 | Danielson et al. | 235/462 |
| 4,896,029 | 1/1990 | Chandler et al. | 235/494 |
| 4,988,852 | 1/1991 | Krishnan | 235/462 |
| 4,998,010 | 3/1991 | Chandler et al. | 235/494 |
| 5,019,699 | 5/1991 | Kosack | 235/472 |
| 5,124,537 | 6/1992 | Chandler et al. | 235/462 |
| 5,155,343 | 10/1992 | Chandler et al. | 235/462 |
| 5,189,292 | 2/1993 | Batterman et al. | 235/494 |
| 5,241,166 | 8/1993 | Chandler | 235/494 |
| 5,349,172 | 9/1994 | Roustaei | 235/472 |
| 5,349,185 | 10/1994 | Hanson | 235/472 |

FOREIGN PATENT DOCUMENTS

| | | |
|---|---|---|
| 0449634A2 | 10/1991 | European Pat. Off. . |
| 0450878A1 | 10/1991 | European Pat. Off. . |
| 0524029A2 | 1/1993 | European Pat. Off. . |

Primary Examiner—Harold Pitts
Attorney, Agent, or Firm—Seed and Berry

[57] ABSTRACT

A symbology reader employing an area detector and LEDs mounted at various angular orientations on a printed circuit board for illuminating a target object in an object plane. Each of the LEDs is oriented according to a desired beam vector to illuminate a particular area of the object plane so that the sum of the beams produces a desired illumination pattern. In one embodiment, the illumination pattern is selected to be inversely proportional to the sensitivity of the area detector to provide an even response over an entire image area. The individual LEDs are angularly aligned by an alignment board having an alignment aperture for each LED. The LEDs are mounted onto the printed circuit board with their body portions spaced apart from the board and supported by semi-rigid wire leads soldered to the board. Each of the alignment holes of the alignment board is laterally offset slightly from the mounting position of the LED. The LEDs are angularly aligned by moving the alignment board toward the printed circuit board and engaging sidewalls of the alignment holes with the LED body portions to deflect the LEDs toward a desired angular orientation. When the alignment board reaches a selected distance from the printed circuit board with the LEDs deflected to their desired orientation, the alignment board is fixed in place to hold the LEDs in this orientation.

12 Claims, 5 Drawing Sheets

SYMBOLOGY READER ILLUMINATION SYSTEM

TECHNICAL FIELD

This invention relates to the formation of a desired illumination pattern for a target object of a symbology reader.

BACKGROUND OF THE INVENTION

Symbology readers, such as bar code readers, are well known. They are used in a wide range of applications, including inventory tracking and control. Most symbology readers utilize an illuminating light source which is swept across a symbology to generate a light signal indicative of the relative reflectivities of various scanned regions of the target object. Such swept or scanned systems are relatively complex due to their moving mirrors and related drive circuitry. They are also limited to scanning along a line, making application of such systems to two-dimensional symbology difficult and requiring raster scanning techniques.

With the advent of area type readers, requirements for illumination of the area of interest have changed. Rather than providing a fixed point of illumination to be swept across an area containing a symbology, area type readers typically require the entire area of a target object to be illuminated simultaneously.

One such method of illumination proposed in European Patent Application EPA 0 524 029 A2 utilizes flash optics formed from a xenon tube to provide an illuminated area approximately the same size as the imaged area. Such systems typically have relatively high power consumption and provide a fixed, non-uniform illumination pattern which is not easily adjustable no provide a desired illumination of a target object.

Moreover, a system such as that employing a single xenon tube typically provides an illumination pattern having its highest illumination normally in the center of the illuminated area and a reduced illumination near the perimeter of the illuminated area. Because many detector systems are most sensitive in their central regions and least sensitive around their perimeters, the sensitivity of such a xenon tube illumination system may be significantly reduced near the perimeter of the image area.

SUMMARY OF THE INVENTION

A symbology reader for reading symbology located within a target area on a target object in an object plane includes a housing with a reader aperture providing a passageway for light into and out of the housing. The reader also includes a base mounted within the housing and at least three illuminating sources mounted to the base to produce light to illuminate the target area. Each of the illuminating sources is oriented at a predetermined angle to emit a beam of light with the beams being directed to illuminate at least three different regions of the target area with at lease one beam illuminating each of the regions. A detector assembly mounted within the housing is positioned to receive light through the reader aperture which is reflected from the target object. In one embodiment, the illuminating sources are LEDs.

In one embodiment, the reader includes an alignment board mounted within the housing in a fixed position and at a selected distance from the base. The alignment board is positioned between the base and the object plane and includes at least three alignment apertures, with each aperture corresponding to one of the illuminating sources and being defined by a sidewall engaging a corresponding one of the illuminating sources no hold the illuminating source in its angular orientation.

In one embodiment, the illuminating sources are selected to produce an illumination pattern in the object plane inversely proportional to a predetermined pattern of sensitivity to light of the detector assembly. To permit light to reach the detector assembly, a central aperture is formed in the alignment board. To retain the alignment board in its predetermined position, spacer nuts are positioned intermediate the alignment board in the base.

In one embodiment, a resilient layer, such as a foam layer, is positioned between the alignment board and the base and resiliently engages the illuminating sources to provide mechanical support.

In one embodiment, the reader includes a head portion and a handle with the illuminating sources and detector assembly mounted within the head portion. The illuminating sources have body portions with semi-rigid leads connected at selected locations on the base with a space between the body portion and the planar base. In this embodiment, the alignment apertures through the alignment board are offset from the selected locations of the illuminating sources and the sidewalls of the alignment apertures engage the body portion and hold the semi-rigid leads in a bent state to maintain alignment of a principal emission vector of each of the illuminating sources with a desired beam vector for that illuminating source.

In one embodiment, the symbology reader includes a plurality of illuminating sources mounted to the housing for producing light to illuminate the target area. Each of the illuminating sources is mounted to the housing and is mounted at a predetermined angle to illuminate one of at least two different regions of the target area.

The reader also includes a source for producing a spotter beam to provide a visible indication in the target object of the proper alignment of the reader to the target area. The detector assembly within the reader detects light from the illuminating sources which is reflected from the target object.

In one method of illuminating a target object according to the invention, a desired illumination pattern is determined for an object plane of the symbology reader. Locations are selected on the base for the illuminating sources and angular orientations are selected for each of the selected source locations relative to the base. The orientation angles are selected based upon the known beam patterns of the illuminating sources and the desired illumination pattern in the object plane. The illuminating sources are mounted at each of the selected source locations and the illuminating sources are aligned such that their principal emission vector is aligned with the selected orientation angle by adjusting the angular orientation of the body portion of the illuminating source.

In one embodiment, the body portions are aligned by positioning the alignment board in a first position between the base and the object plane at a distance from the base greater than the selected distance with the apertures generally aligned with the corresponding source body portion. The alignment board is controllably moved toward the base and into engagement with the source body portions until the base and alignment board are separated by the selected distance so that the alignment aperture sidewalls engage the source body portions and angularly move the source body portions until their principal emission vectors are aligned with their respective selected orientation angles.

In one embodiment, the desired illumination pattern is determined by determining the sensitivity of the detector assembly, the light directed toward the detector assembly from a plurality of locations in the object plane, and computing an illumination intensity inversely proportional to the sensitivity of the detector assembly to light from the locations in the object plane.

In a method of reading a symbology according to the invention, a plurality of illuminating sources are aligned with their principal emission vectors directed toward different regions of a target area on a target object. Each of the illuminating sources is mounted at a selected mounting location and oriented at a predetermined angle. Each of the illuminating sources is then energized to produce a desired illumination pattern at the target area. Illumination produced by the illuminating sources and reflected from the target area is then detected by the detector assembly.

DETAILED DESCRIPTION OF THE INVENTION

Figure 1:
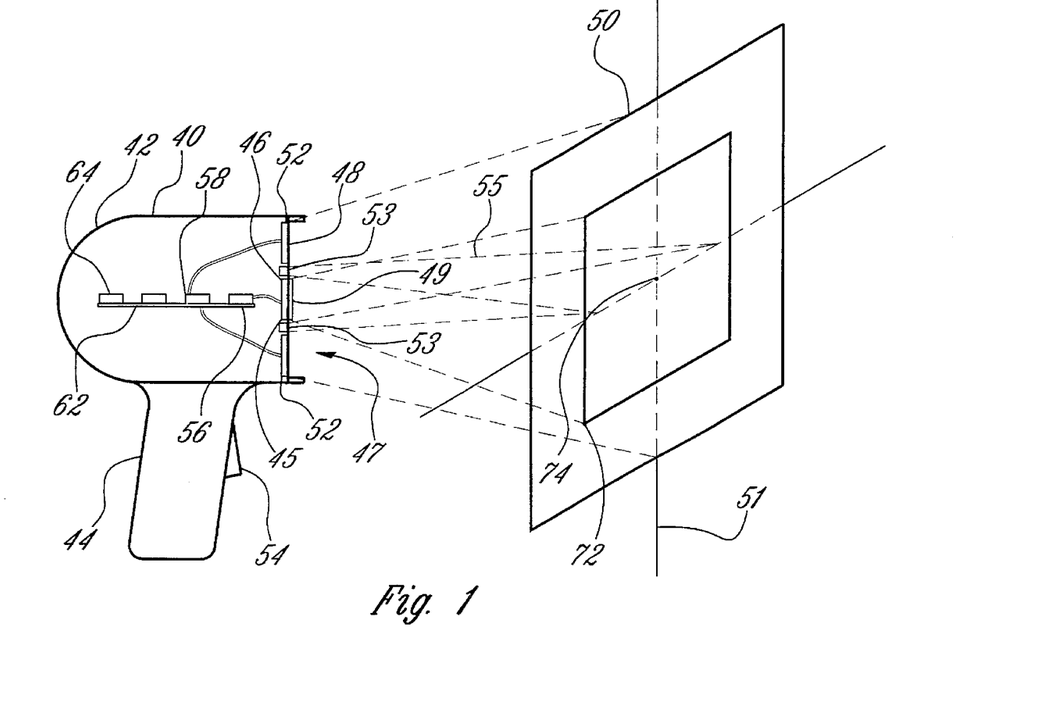
FIG. 1 is a schematic drawing of a symbology reader embodying the present invention shown illuminating a target object.

As shown in FIG. 1, a symbology reader 40 includes a head portion 42 mounted atop a handle 44. A detector assembly 45, including a detector array 46 and imaging optics 49, is mounted within the head portion 42 and oriented to receive light incident upon the detector assembly 45 Through an aperture 47 in a reader face 48 of the symbology reader 40. The incident light is transmitted to the detector array 46 through the imaging optics 49 and, in response to such incident light, the detector array 46 generates electrical signals. The electrical signals are input to a microprocessor 56 mounted to a printed circuit board 62 mounted within the head portion 42. While the detector assembly 45 of this embodiment includes the detector array 46 and imaging optics 49, other known area detectors are within the scope of the invention.

To aid in the alignment of the reader to a target object 50 in an object plane 51, a pair of visible Light sources 53 for producing spotter beams 55 are mounted to the printed circuit board 62. While two visible light sources 53 are shown, any number of visible light sources may be appropriate for certain applications. Further, a reader having no source of a spotter beam is within the scope of the invention. The spotter beam 55 is produced by the visible light sources 53 in response to actuation of a multi-position trigger switch 54 mounted in the handle 44. When the trigger switch 54 is depressed to a first position, the visible light sources 53 are energized by conventional electronics 58 under control of the microprocessor 56.

To provide illumination of the target object 50, an illuminating light source 52 is also mounted within the head portion 42 and oriented to emit light from the reader face 48 toward the target object 50. The light source 52 is energized under control of the microprocessor 56 and additional conventional electronics 58 in response to actuation of the trigger switch 54. The conventional electronics 58 are mounted to the printed circuit board 62.

The symbology reader 40 operates using flash illumination. That is, when the trigger switch 54 is depressed, the illuminating light source 52 is activated for only a brief period of time during which the target object 50 is illuminated. During the time in which the target object 50 is illuminated, the detector assembly 45 receives light reflected from the target object 50 and the detector array 46 generates electrical signals proportional to the light energy received from each portion of the illuminated target object 50. Where power consumption is not critical, flash illumination may not be necessary, instead, the illuminating light source 52 may be continuously activated.

The electrical signals generated by the detector array 46 are converted to digital signals by the conventional electronics 58 under control of the microprocessor 56. Consequently, a digital "picture" of the target object 50 is produced by the microprocessor 56. This digital picture may be decoded contemporaneously or may be stored in a memory 64 mounted to the printed circuit board 62 within the symbology reader 40 for later decoding.

Figure 2:
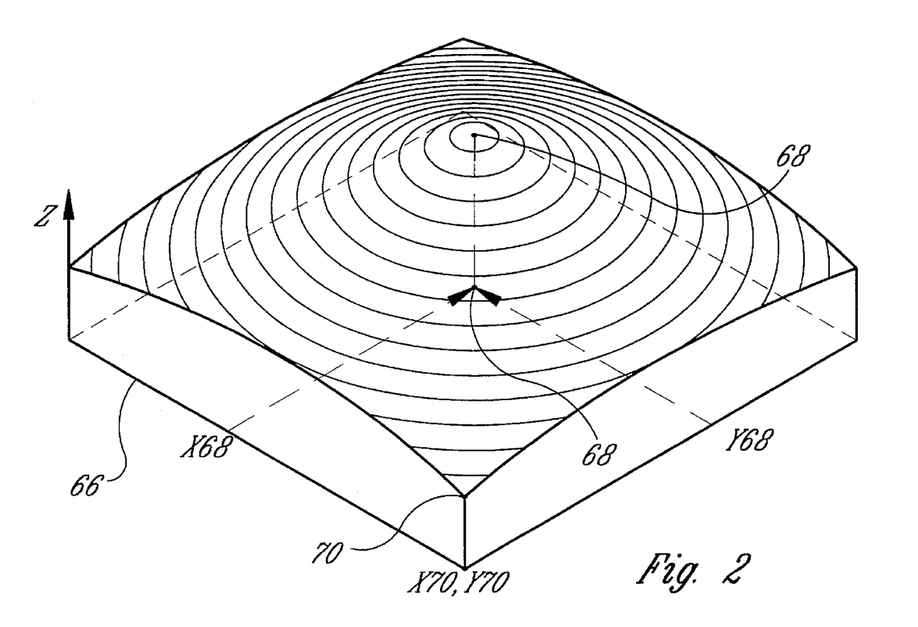
FIG. 2 is a representational view of a sensitivity pattern for a detector assembly of the symbology reader of FIG. 1.

The detector array 46 used in the preferred embodiment of the invention is a conventional charge coupled device ("CCD") detector array. As is known in the art, such detector arrays can show sensitivity to light as a function of angle of incidence. The imaging optics 49 may also decrease the uniformity of response of the detector assembly 45. As represented graphically in FIG. 2, the sensitivity of a the detector assembly 45 to light from various locations in the object plane 51 varies according to the specific location in the object plane 51 as a consequence of the angle of incidence of the imaging rays corresponding to light from each such location in the object place. In FIG. 2, the sensitivity is represented by the Z- vertical axis dimension. For the example of FIG. 2, the sensitivity of the detector assembly 45 is greatest to light from a point 68 which is indicated at X, Y coordinates $X_{68}$, $Y_{68}$. Similarly, the detector assembly 45 is least sensitive at point 70, as represented by X, Y coordinates $X_{70}$, $Y_{70}$ which correspond to the lower right corner of the object field.

To improve uniformity of response of the detector assembly 45 to light from the object plane, the symbology reader 40 utilizes an illumination pattern which is inversely proportional to the sensitivity of the detector assembly 45. That is, the illumination pattern has a maximum illumination of the target object 50 in the object plane 51 at a point 72 (FIG. 1) corresponding to the point 70 (FIG. 2) of least sensitivity of the detector assembly. In a similar fashion, the illumination of the target object is least intense at a point 74 (FIG. 1) corresponding to the point 68 (FIG. 2) of maximum sensitivity of the detector assembly 45.

Figure 3A:
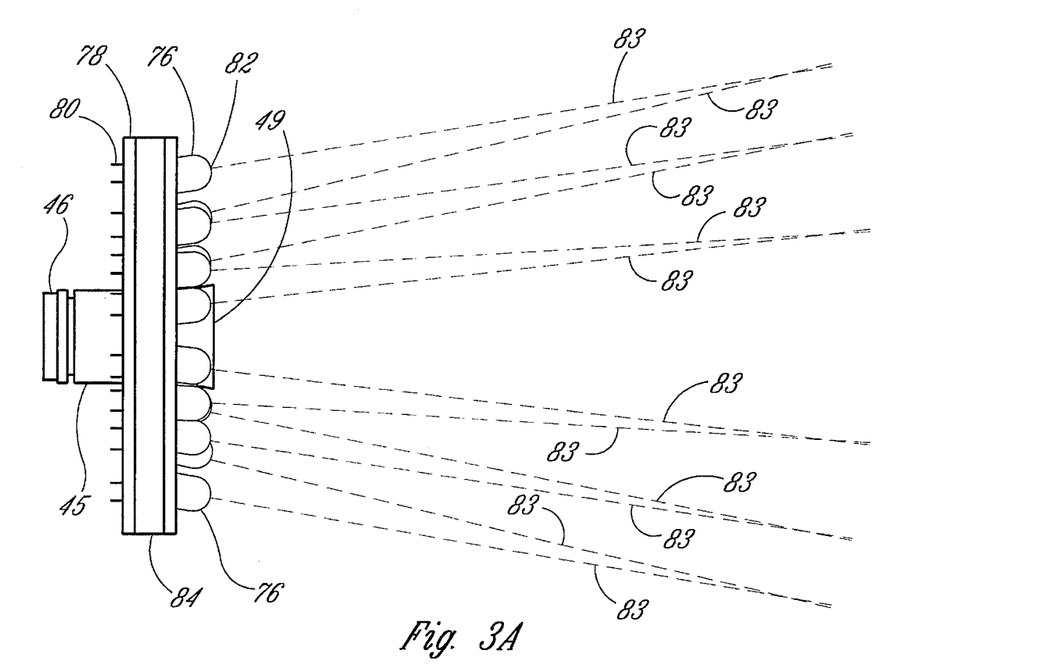
FIG. 3A is an enlarged top view of an illumination head portion of the symbology reader of FIG. 1, showing beam vectors.
Figure 3B:
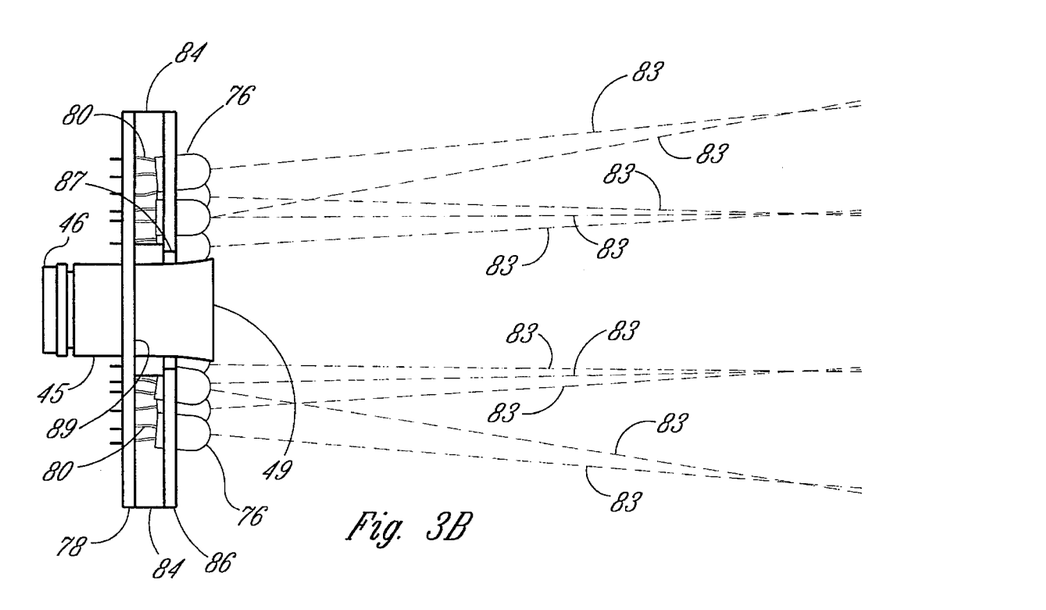
FIG. 3B is an enlarged side cross-sectional view of an illumination head portion of the symbology reader of FIG. 1, showing beam vectors.

The symbology reader 40 achieves the desired illumination pattern by constructing the light source 52 from a plurality of independent light-emitting diodes ("LEDs") 76, each oriented to emit light along a predetermined beam vector 83, as shown in FIGS. 3A and 3B. The LEDs 76 each have a pair of semi-rigid wire leads 80 mounted to a printed circuit board 78 which serves as a planar base. The wire leads 80 of the LEDs 76 have their distal ends soldered to the printed circuit board 78. A central portion 89 of the printed circuit board 78 has no LEDs 76 mounted thereon to provide a convenient, centrally located position whereat the detector assembly 45 is mounted.

Each of the LEDs 76 emits light along a principal emission vector which is aligned with a desired beam vector 83 with each LED having its own predetermined distribution of light or illumination pattern. Typically, the distribution of light intensity is highest directly along the beam vector and diminishes off-axis from the beam vector. In a typical distribution, the light may be emitted in a generally asymmetric or Gaussian pattern. After the desired illumination pattern in the object plane 51 is determined for the detector assembly 45 (i.e., the pattern inversely proportional to the sensitivity of the detector assembly), it may be approximated by summing the illumination patterns of each of the LEDs 76 in the object plane. For example, light from several of the LEDs 76 is aimed generally toward the region of the object plane 51 containing the point 72 (FIG. 1) where the illumination intensity is intended to be greatest. Similarly, few, or none, of the LEDs 76 are aimed directly toward the region containing the point 74 (FIG. 1) where the illumination intensity is to be minimized. The LEDs 76 are individually aimed so that the resulting overall illumination pattern produced by the LEDs is the desired illumination pattern in the object plane 51.

Preferably, the LEDs are aligned with a four-quadrant symmetry. That is, the LEDs 44 are symmetrically positioned about the center of the printed circuit board 78 or the detector assembly 45, with complementary LED positions and angles in the upper-right, upper-left, lower-right and lower-left quarters of the printed circuit board 78. For example, as shown in FIGS. 3A and 3B, LEDs 76A and 76B are equally offset sidewardly from the detector assembly 45 and generate light along beam vectors 83A and 83B, respectively, at corresponding reflected angles. Similarly, in FIG. 3B, LEDs 76C and 76D are equally offset above and below the detector assembly 45 and generate light along beam vectors 76C and 76D, respectively, at corresponding reflected angles.

Each of the LEDs 76 is aligned to its desired beam vector 83 by angularly orienting a body portion 82 of the LED relative to the planar printed circuit board 78. The body portion 82 of the LED is aligned to its desired beam vector orientation by selective bending of its semi-rigid wire leads 80. Once oriented as desired, the LEDs 76 are retained in place by a resilient foam layer 84 prior to soldering the leads to base 78.

To provide additional mechanical support for the LEDs 76, the resilient layer 84 is positioned intermediate the body portions 82 of LEDs 76 and the printed circuit board 78. The wire leads 80 penetrate through the resilient layer 84 with a distal portion of each wire lead 80 protruding from the resilient layer and entering a corresponding conventional mounting hole 85 (FIG. 4) in the printed circuit board 78 in which it is soldered.

Figure 4:
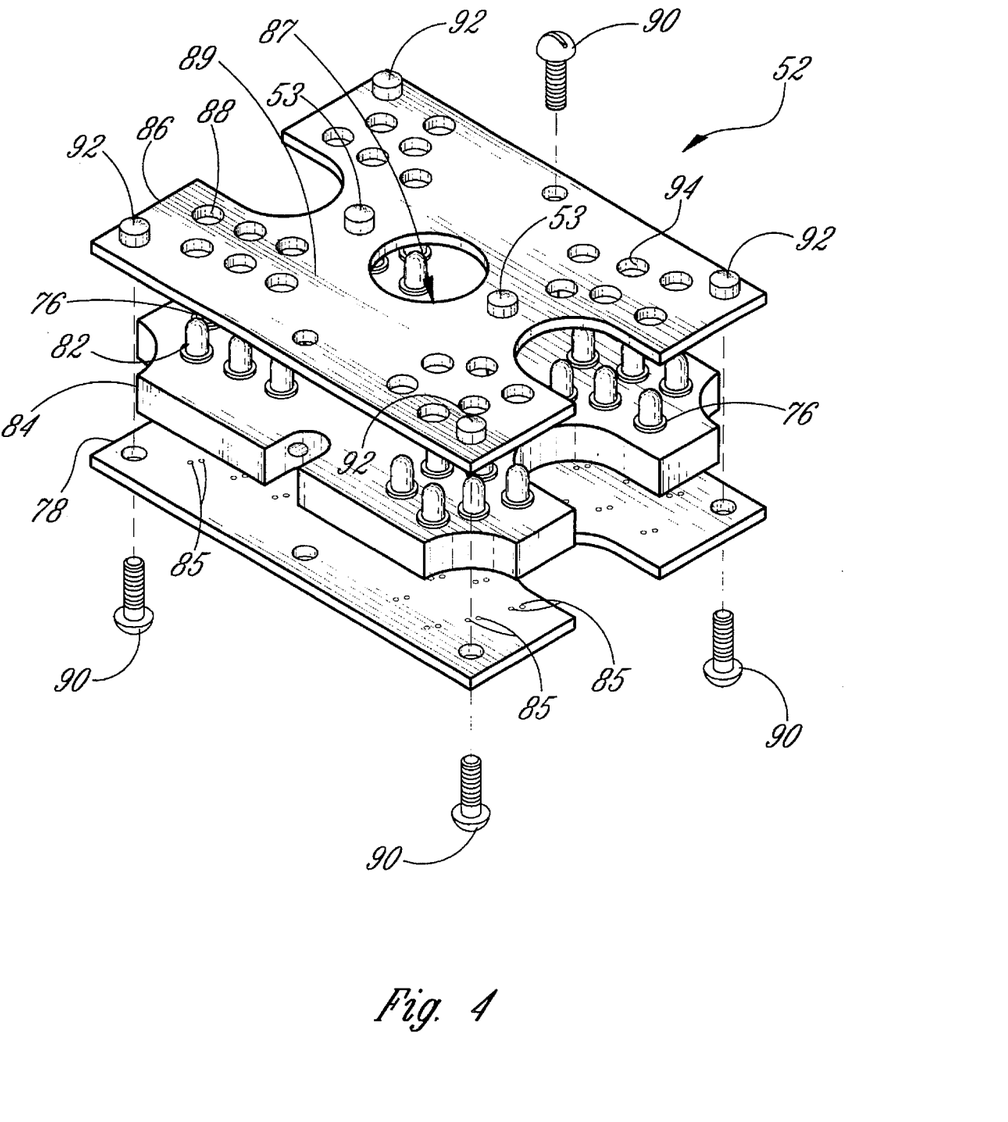
FIG. 4 is an enlarged isometric, exploded view of the illumination head portion of FIG. 3 with spacer nuts removed.

To provide additional mechanical support, and, as described hereinafter, to properly angularly orient the body portions 82 so the LEDs 76 emit light along the desired beam vectors 83, an alignment board 86 is utilized. The alignment board 86 has a number of alignment apertures 88 therethrough corresponding to the number of the LEDs 76 used and is fixedly attached to the printed circuit board 78 with a predetermined spacing therebetween using several mounting screws 90. The screws 90 pass through the printed circuit board 78 and engage corresponding threaded spacer nuts 92, as best seen in FIG. 4, which are attached to the alignment board 86 and project from the underside of the alignment board toward the printed circuit board. The spacer nuts 92 project a predetermined distance to engage the printed circuit board and hold the printed circuit board and the alignment board spaced apart by the predetermined spacing.

Each of the alignment apertures 88 in the alignment board 86 is positioned and sized to correspond to a respective one of the LEDs 76. The alignment aperture 88 for a particular LED 76 is substantially aligned with, but slightly offset from, the mounting holes 85 for the LED as necessary to orient and retain the body portion 82 of the LED in the desired angular orientation. A central aperture 87, best seen in FIG. 3B, corresponding to the detector assembly 45 provides a passageway so that light may reach the detector assembly 45 through the imaging optics 49 unobstructed by the alignment board 86. It should be noted that, if a particular one of the LEDs 76 is to emit light transverse to the printed circuit board 78, the offset will be zero, such that the alignment aperture 88 will be centered with the corresponding mounting holes 85 for the LED 76.

When the light source 52 is completely assembled, the alignment board 86, the resilient layer 84, and the printed circuit board 78 form a sandwich-like structure with the resilient layer 84 trapped between the alignment board and the printed circuit board. As best seen in FIG. 3, the alignment board 86 is spaced apart from the printed circuit board 78 so that an outward end of the body portion 82 of each LED 76 is protruding from the alignment apertures 88 of the alignment board in a direction opposite the printed circuit board 78.

Figure 5:
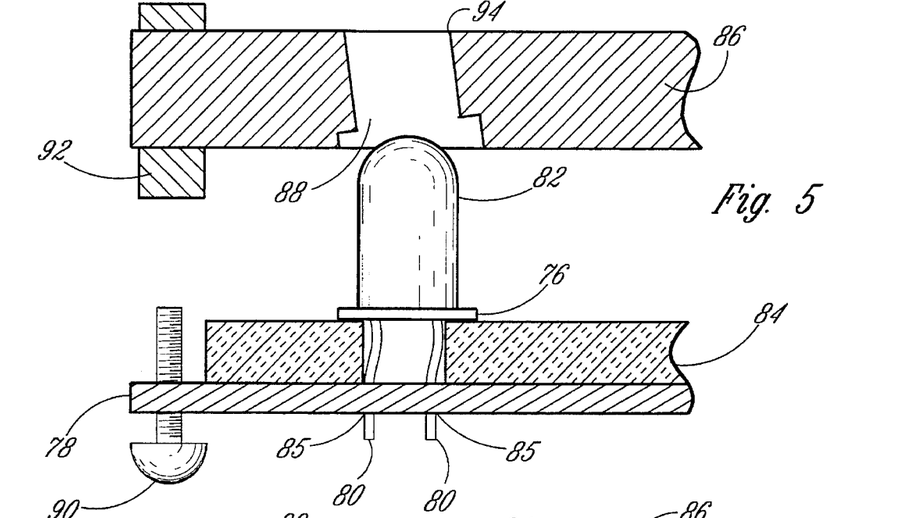
FIG. 5 is an enlarged fragmentary, cross-sectional view of the illumination head portion of FIG. 3 in a first stage of manufacture according to the present invention.
Figure 6:
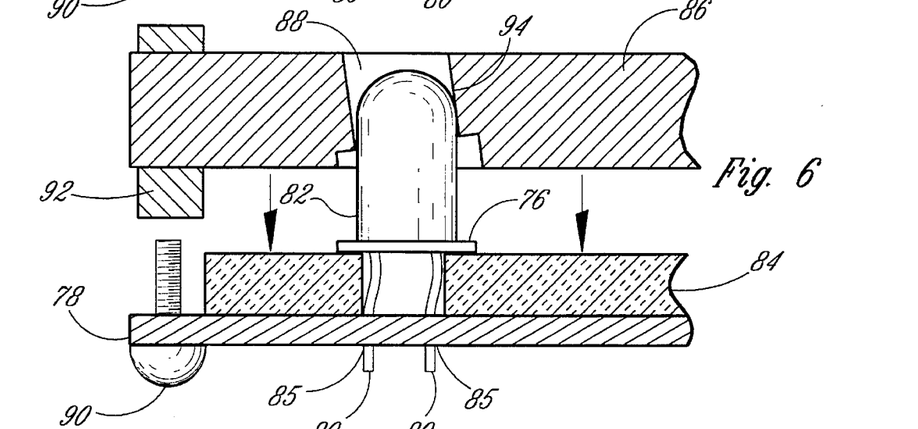
FIG. 6 is a fragmentary, cross-sectional view of the illuminating head portion shown in FIG. 5 in a second stage of manufacture.
Figure 7:
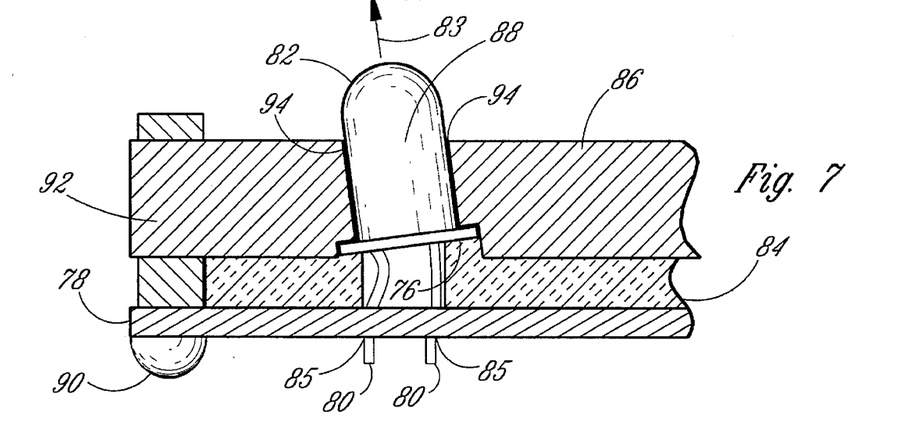
FIG. 7 is a fragmentary, cross-sectional view of the illumination head portion shown in FIG. 6 in a fully assembled stage of manufacture.

The manner of assembling the light source 52 is shown in greater detail in FIGS. 5–7. The alignment board 86 is brought toward the printed circuit board 78, with the screws 90 aligned with the corresponding spacer nuts 92 and the alignment apertures 88 generally aligned with their corresponding LEDs 76, as shown in FIG. 5. The wire leads 80 of the LEDs 76 are soldered into their respective mounting holes 85 with the body portions 82 of the LEDs oriented generally perpendicular to the printed circuit board 78.

As shown in FIG. 6, when the screws 90 first threadably engage the spacer nuts 92, the body portions 82 of the LEDs 76 have their outward ends in the alignment apertures 88 but without the alignment board 86 contacting them, or if in contact, not applying significant force thereto. As noted above, each of the alignment apertures 88 is slightly offset from the mounting holes 85 for the corresponding one of the LEDs 76, and hence offset from the body portion 82 of the corresponding LED (except for those LEDs where no angular adjustment is desired).

As the screws 90 are turned to draw the alignment board 86 toward the printed circuit board 78, a sidewall 94 of the alignment board 86 defining each of the alignment apertures 88 moves toward engagement with the body portion 82 of the corresponding LED 76, as best seen in FIG. 6. A cylindrical bore is formed in the alignment board 86 at a desired angle to form each alignment aperture 88 preferably at an angle, and with size so that the sidewall 94 of the alignment aperture will snugly engage and hold the body portion 82 of the LED 76.

As the alignment board 86 is moved more toward the printed circuit board 78, the sidewalls 94 of the alignment apertures 88 force the body portion 82 of the LEDs 76 into the angular orientation desired and cause the semi-rigid wire leads 80 of the LEDs to bend. When the screws 90 have been turned to bring the spacer nuts 92 into engagement with the printed circuit board 78, as shown in FIG. 7, the alignment board 86 is rigidly attached to the printed circuit board 78 at the predetermined spacing with the LEDs 76 angularly aligned to emit light along the desired beam vectors 83 and to provide the desired illumination pattern for the light source 52. In this position the resilient layer 84 surrounds the wire leads 80 and engages the body portion 82 of the LEDs 76. The alignment board 86 holds the LEDs 76 in the desired angular orientation during use of the symbology reader 40.

Figure 8:
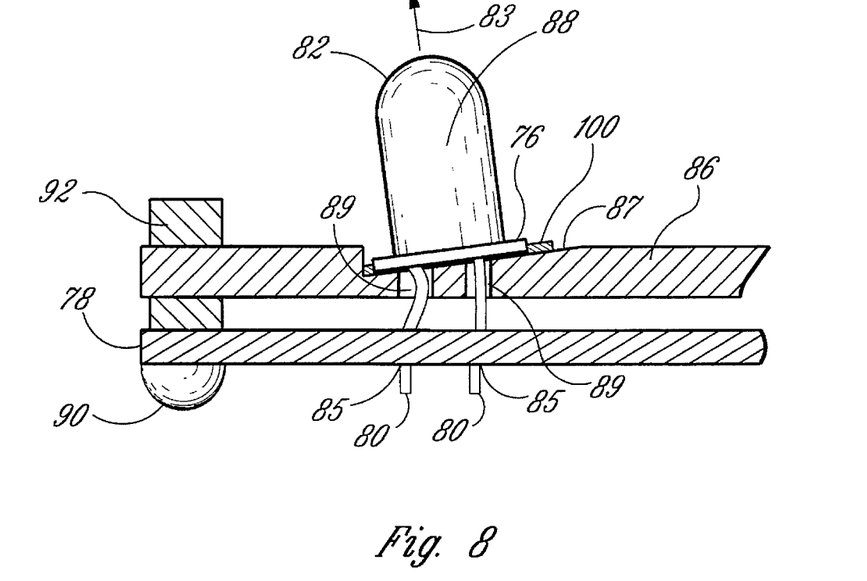
FIG. 8 is a fragmentary, cross-sectional view of an alternative illumination head portion having the alignment board intermediate the body portions of the LEDs and the printed circuit board 78.

Though the preferred embodiment uses apertures 88 having sidewalls engaging the body portions, the alignment may be adapted to engage and align the LEDs in a variety of configurations. For example, the alignment board 86 may be positioned beneath the body portion 82, as shown in FIG. 8. In this embodiment, the alignment board 86 has an upper surface including beveled surfaces 87 corresponding to the mounting locations. The leads 80 of the LEDs 76 are inserted through lead holes 89 in the alignment board 86. The leads 80 pass through the mounting holes 85 (FIG. 4) in the printed circuit board 78. The LEDs 76 are then pressed downwardly such that the lower ends of the body portions 82 engage the beveled surfaces 87, forcing the LEDs 76 into alignment. The LEDs 76 are then bonded to the alignment board 86 in a known fashion, such as with an adhesive 100 and the leads 80 are soldered to the printed circuit board 78.

Figure 9:
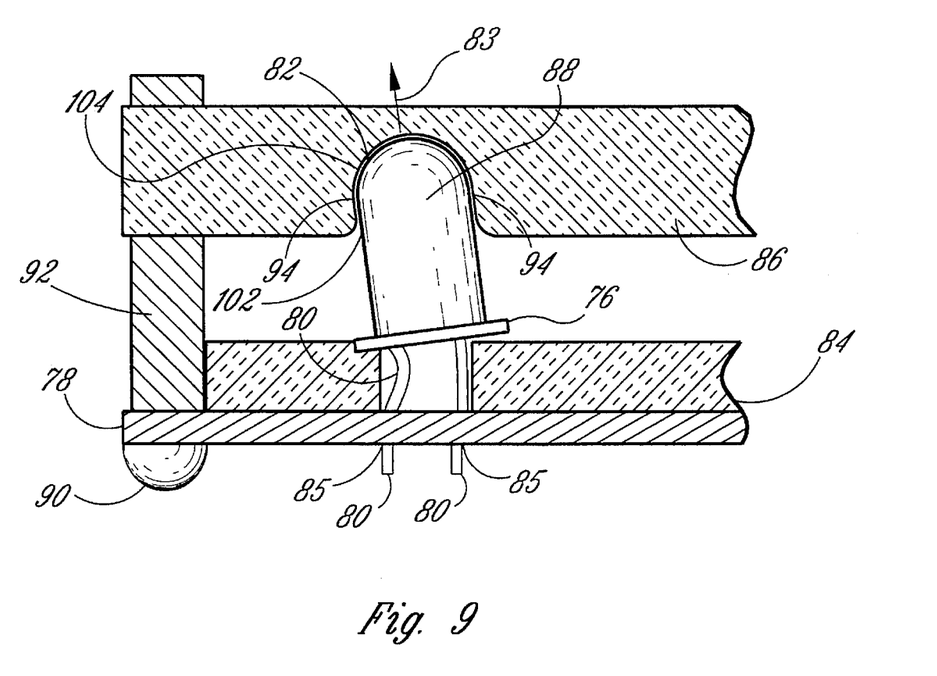
FIG. 9 is a fragmentary, cross-sectional view of an alternative embodiment of the illuminating head portion having a transparent alignment board.

In another alternative embodiment, shown in FIG. 9, the alignment board 86 is made of a transparent material and includes angled recesses 102 in place of the alignment apertures 88. Assembly of this embodiment is substantially similar to that of the embodiment of FIG. 7, except that, as the alignment board 86 is brought into position above the printed circuit board 78, the body portion 82 of the LEDs 76 are forced into alignment by engaging sidewall portions 104 of the inner surfaces defining the recesses 102. As with the embodiment of FIGS. 5–7, the sidewall portions 104 are aligned so that they guide the LED 76 into an angular orientation to emit light along the desired beam vector 83. The inner surfaces of the recesses engage the body portions 82 of the LEDs 76 and hold them in position and alignment. The alignment board need only be transparent to light from the LEDs 76 in the regions between the LEDs 76 and the target object 50. The material of the alignment board 86 may alternatively be wavelength selective to preferentially transparent light at the wavelength of the LEDs 76 and block light at other wavelengths.

The actual orientation angle of each of the LEDs 76 may be calculated or determined empirically. To calculate the orientation angle, the desired illumination intensity at each point in the object plane 51 is determined, as described above. The illumination pattern of the individual LEDs 76 is then determined, for example by examining specifications from the manufacturer, or by actual measurement. Next, mounting locations for the LEDs on the printed circuit board 78 are chosen, making into account factors such as clearances between the body portions 82 of the LEDs and the detector assembly 45, and routing of conductor paths on the printed circuit board 78. Then, the desired illumination pattern in the object plane 51 is calculated as the sum of the individual illumination patterns of the LEDs 76, using known techniques, such as computer modeling.

Alternately, the desired orientations may be determined empirically by mounting the LEDs 76 to the printed circuit board 78 in selected locations. Then, the angular orientations of the body portions 82 of the LEDs may be iteratively adjusted until an illumination pattern sufficiently close to the desired illumination pattern is achieved.

Once the position and angular orientation of each LED 76 is determined, the position of each of the alignment apertures 88 in the alignment board 86 is determined. This may be done by determining the respective locations of the intersections of central axes of the body portions 82 of the LEDs 76 with the plane in which the alignment board 86 will be held fixed. Each of the alignment apertures 88 is then formed with its central axis in alignment with determined location on the alignment board.

It will be appreciated that, although a specific embodiment of the invention has been described herein for purposes of illustration, various modifications may be made without departing from the spirit and scope of the invention. Accordingly, the invention is not limited except as by the appended claims.

We claim:

1. A symbology reader for reading a symbology located within a target area on a target object substantially in an object plane, comprising:

a housing having a reader aperture providing a passageway for light into and out of the housing;

a base mounted within the housing;

at least three illuminating sources mounted to the base for producing light to illuminate the target area, each of the illuminating sources having a body portion, each of the illuminating sources when energized emitting a beam of light along a principal emission vector relative to its body portion, the body portion being oriented to align the principal emission vector with a corresponding desired beam vector toward the object plane, the desired beam vectors being non-parallel and selected to produce the desired illumination pattern when the at least three illuminating sources are energized which simultaneously illuminate the entire symbology within the target area, the desired beam vectors being selected to illuminate at least three different regions of the symbology with at least one illuminating source illuminating each of the regions; and a detector assembly mounted within the housing and positioned to receive light through the reader aperture from the illuminating sources after being first reflected from the symbology within the target object and wherein the detector assembly has a pattern of sensitivity to light from the object plane wherein the principal emission vectors of the at least three illuminating sources are aligned such that the desired illumination pattern in the object plane is inversely proportional to the pattern of sensitivity of the detector assembly.

2. The symbology reader of claim wherein the illuminating sources are LEDs.

3. The symbology reader of claim 1 wherein the detector assembly includes a detector array and imaging optics.

4. The symbology reader of claim 3, further including:

an alignment board mounted within the housing in a fixed position and at a selected distance from the base, between the base and the target object, the alignment board having at least three alignment apertures therethrough, each corresponding to one of the at least three illuminating sources, each of the alignment apertures being defined by a sidewall engaging a corresponding one of the body portions to hold the engaged body portion such that the corresponding principal emission vector is aligned to the corresponding desired beam vector.

5. The symbology reader of claim 4 wherein the alignment board includes a central aperture therethrough, the aperture providing a passageway for light to reach the detector assembly.

6. The symbology reader of claim 5, further comprising a plurality of spacer nuts intermediate the alignment board and the planar base for holding the alignment board at the selected distance from the planar base.

7. The symbology reader of claim 5, further comprising a resilient layer positioned intermediate the alignment board and the base, the resilient layer engaging the illuminating sources to provide mechanical support therefor.

8. A symbology reader for reading a symbology located on a target object substantially in an object plane, the target area being larger than the symbology, comprising:

a base;

at least three simultaneously energizable, illuminating sources mounted to the base for producing light to illuminate the target area, each of the illuminating sources when energized emitting a beam of light along a principal emission vector relative to the base, the principal emission vector being aligned to a corresponding desired beam vector toward the object plane, the desired beam vectors being non-parallel and selected to produce a desired illumination pattern when the at least three illuminating sources are energized which illuminate the entire target area, the desired beam vectors being selected to illuminate at least three different regions of the target area with at least one illuminating sources illuminating each of the regions; and an area-type detector, fixedly positioned relative to the base and oriented to receive light from the illuminating sources after being first reflected from a region of the target object at least as large as the symbology the dectector has a pattern of sensitivity to light from the object plane and wherein the principal emission vectors of the at least three illuminating sources are aligned such that the desired illumination pattern in the object plane is inversely proportional to the pattern of sensitivity of the detector array.

9. The symbology reader of claim 8 wherein the illuminating sources are LEDs.

10. The symbology reader of claim 8, further including:

an alignment board mounted in a fixed position and at a selected distance from the base, between the base and the object plane, the alignment board having at least three alignment apertures therethrough, each corresponding to one of the at least three illuminating sources, each of the alignment apertures being defined by a sidewall engaging a body portion of a corresponding one of the illuminating sources to hold the engaged body portion such that the corresponding principal emission vector is aligned to the corresponding desired beam vector.

11. The symbology reader of claim 10, further comprising a resilient layer positioned intermediate the alignment board and the base, the resilient layer engaging the at least three illuminating sources to provide mechanical support therefor.

12. The symbology reader of claim 10 wherein the alignment board includes a central aperture therethrough, the aperture providing a passageway for reflected light to reach the detector.

* * * * *

UNITED STATES PATENT AND TRADEMARK OFFICE
CERTIFICATE OF CORRECTION

PATENT NO. : 5,504,367
DATED : April 2, 1996
INVENTOR(S) : Kevork G. Arackellian, Steven M. Bunce and Joel T. Aragon It is certified that error appears in the above-indentified patent and that said Letters Patent is hereby corrected as shown below:

In column 9, claim 2, line 1, following "claim", please insert therefor--1--.

Signed and Sealed this

Fourth Day of June, 1996

Attest:

BRUCE LEHMAN

*Attesting Officer*          *Commissioner of Patents and Trademarks*